United States Patent [19]
Kleinsasser

[11] Patent Number: 5,010,849
[45] Date of Patent: Apr. 30, 1991

[54] FEEDER FOR ANIMALS

[75] Inventor: Jonathan R. Kleinsasser, Ste. Agathe, Canada

[73] Assignee: Crystal Spring Colony Farms Ltd., Agathe, Canada

[21] Appl. No.: 415,619

[22] Filed: Oct. 2, 1989

[51] Int. Cl.⁵ .............................................. A01K 5/00
[52] U.S. Cl. ...................................................... 119/53
[58] Field of Search ...................... 119/51.5, 52.1, 53, 119/53.5, 74, 54

[56] References Cited

U.S. PATENT DOCUMENTS

| | | | |
|---|---|---|---|
| 349,480 | 9/1886 | Chenoweth | 119/52.1 X |
| 1,206,281 | 11/1916 | Wood | 119/74 |
| 1,340,869 | 5/1920 | Ashley | 119/53 |
| 1,368,553 | 2/1921 | Frost | 119/53.5 |
| 1,719,245 | 7/1929 | Smidley | 119/53.5 |
| 4,660,508 | 4/1987 | Kleinsasser et al. | 119/51.5 |

FOREIGN PATENT DOCUMENTS 1202840 4/1986 Canada .
1170438 1/1959 France ............................... 119/53
812017 4/1959 United Kingdom .

Primary Examiner—Robert P. Swiatek
Assistant Examiner—Todd E. Manahan
Attorney, Agent, or Firm—Adrian D. Battison; Stanley G. Ade; Murray E. Thrift

[57] ABSTRACT

A feeder for animals particularly pigs includes a trough having a front wall, a base and a rear wall. A shelf is positioned over the rear wall so as to project forwardly from the rear wall. A hopper deposits feed onto the shelf so that the animal can eat from the shelf or brush the feed into the trough. The shelf is separate from the rear wall so that it can be raised and lowered relative to the rear wall leaving a space underneath the shelf and at the top of the rear wall. The trough can then be cleaned by injection of a liquid spray which cleans out the crevices of the trough and jets the material up the rear wall and under the shelf to be discharged through the floor. The feeder can therefore be easily cleaned while it remains in a stationary position in the pen.

6 Claims, 3 Drawing Sheets

FEEDER FOR ANIMALS

BACKGROUND OF THE INVENTION

This invention relates to a feeder for animals of a type which is designed to allow ready cleaning of the feeder. The feeder is particularly but not exclusively designed for use with pigs.

Feeders for pigs generally comprise a trough which has a base wall resting upon the ground, a front wall which generally inclines upwardly and forwardly toward the pig with an upper edge of the front wall at a height which allows the pig to reach over to the base for grasping the feed. A rear wall is provided to confine the material into the trough. A hopper is positioned above the trough so the feed can be deposited into the trough for taking by the animal.

Dry feeders are available in which the hopper feeds directly onto the base wall and allows the material to spread out over the base wall for taking by the animal. The front edge of the hopper is positioned relative to the base wall so that the feed run onto the base wall at a required rate depending upon the flow characteristics of the material.

Various designs of wet feeder are available in which the animal generally grasps or operates a lever or the mechanism to cause feed to fall into the trough where it can be mixed with water supplied from a suitable dispensing nipple.

One particular design of feeder is shown in U.S. Pat. No. 4,660,508 (Kleinsasser) which includes a trough and a shelf positioned above the trough with the feed falling onto the shelf and remaining on the shelf for accessibility by the animal. The shelf is positioned so that the animal can brush the feed on the shelf into the trough. This type of feeder can be used as a wet and dry feeder in which the trough is supplied with water nipples so that the feed can be taken in wet condition and the feed can also be taken directly from the shelf in dry condition. Alternatively the feeder can be used as a strictly dry feeder in which there is no water supplied to the trough and hence the feed is taken in dry condition both at the shelf directly and when brushed into the trough.

In modern hog raising plants it is necessary to insure that after each batch of pigs is processed, all of the equipment including the feeders is properly cleaned to prevent the spread of diseases from one batch to the next. It is essential therefore that each feeder is cleaned on a regular basis at least each time the batch of pigs is removed from the feeder to the next processing position. Feeders are generally cleaned by a high pressure jet of water or cleaning fluid which is injected into the feeder to wash the materials from the feeder. In many feeder designs this is very difficult to do unless the feeder is bodily moved into a different orientation, for example in some cases it is necessary to invert the feeder to access all points for cleaning and to insure that the feeder is fully emptied of water. It is not possible for the feeder to be used with any substantial quantities of water remaining in the feeder which will prevent the feed from properly flowing when replaced in the feeder. It is appreciated that the cleaning of feeders using high pressure jet cleaning fluid is an unpleasant task particularly in situations where the cleaning fluid rebounds or is thrown back from the feeder toward the operator. It would be particularly preferred if the cleaning jet could be properly directed from the feeder to the floor since the floor is generally perforated and designed for collecting liquid waste.

However little attention to this aspect has been given to recent feeder designs and most are difficult to clean with the difficulty applying most particularly to dry feeders.

SUMMARY OF THE INVENTION

It is one object of the present invention to provide a feeder design which allows cleaning of the feeder to take place in a simple and improved manner.

According to a first aspect of invention, therefore, there is provided a feeder for animals comprising a trough means for supporting the trough on a floor surface, the trough being defined by a base wall on which feed can rest for being eaten by the animal, a front wall extending generally upwardly from the base wall to a front edge over which the animal standing on the floor surface can reach to access the feed on the base wall, and a rear wall extending generally upwardly from the base wall to an upper edge thereof, the front wall, rear wall and base wall acting to confine the feed in the trough, the rear edge being shaped and arranged so that material falling outwardly therefrom falls onto the floor surface for disposal, a shelf having a front edge extending along the trough at a position above the base wall, rearwardly of the front wall, forwardly of the rear wall and at a height accessable by the animal, and a hopper above the shelf for depositing the feed onto the shelf for taking by the animal with any feed moved by the animal from the shelf falling into the trough, the shelf being positioned above the rear wall so as to extend from the front edge thereof which is forwardly of the rear wall to a position rearwardly of the rear wall and being separated from the rear wall such that a space is defined between the upper edge of the rear wall and an underside of the shelf to allow a jet of cleaning fluid to exit from the trough moving up the rear wall, under the shelf and over the rear edge.

The design of feeder defined above therefore allows a cleaning jet of cleaning fluid to be directed into the trough generally in the direction downwardly of the front wall onto the base so that the jet goes across the base and can clean all material collecting in the junction between the front wall and the base wall and also at the end plates. The cleaning jet can then access the junction between the base and the rear wall and again remove all deposits. The deposits and the cleaning fluid then move in an upward direction along the rear wall to a position where they encounter the undersurface of the shelf so that the materials are then redirected by the undersurface generally in a downward direction behind the rear wall of the trough so they fall upon the flooring for collection by the waste collection system.

The danger of reflection or rebounding of the liquid in the direction of the operator is thus significantly reduced and also the trough can be fully cleaned without the necessity of any moving bodily of the feeder itself. The use of the shelf type construction in which the feed is deposited initially on the shelf enables the feeder to be continued to be used without being inverted to remove any remaining liquid in the trough since that liquid does not interfere with the flowing of the feed and can be readily removed by the pigs during their normal feeding process.

Preferably the feeder is a type which has two troughs in back to back arrangement in which the shelf extends over the rear walls of both of the troughs and co-operates with each of the troughs for feeding material to a front edge just forwardly of the rear wall of the trough. The space between the troughs and underneath the shelf can then receive the cleaning fluid.

Preferably the shelf is adjustable in a vertical direction to a position which is substantially raised relative to its normal operating position to increase the space between the rear wall and the shelf. In the design where a lower edge of the hopper co-operates with the shelf to control the feed of material onto the shelf, the upward movement of the shelf can be to a position which closes the slot defined between the lower edge and the shelf.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
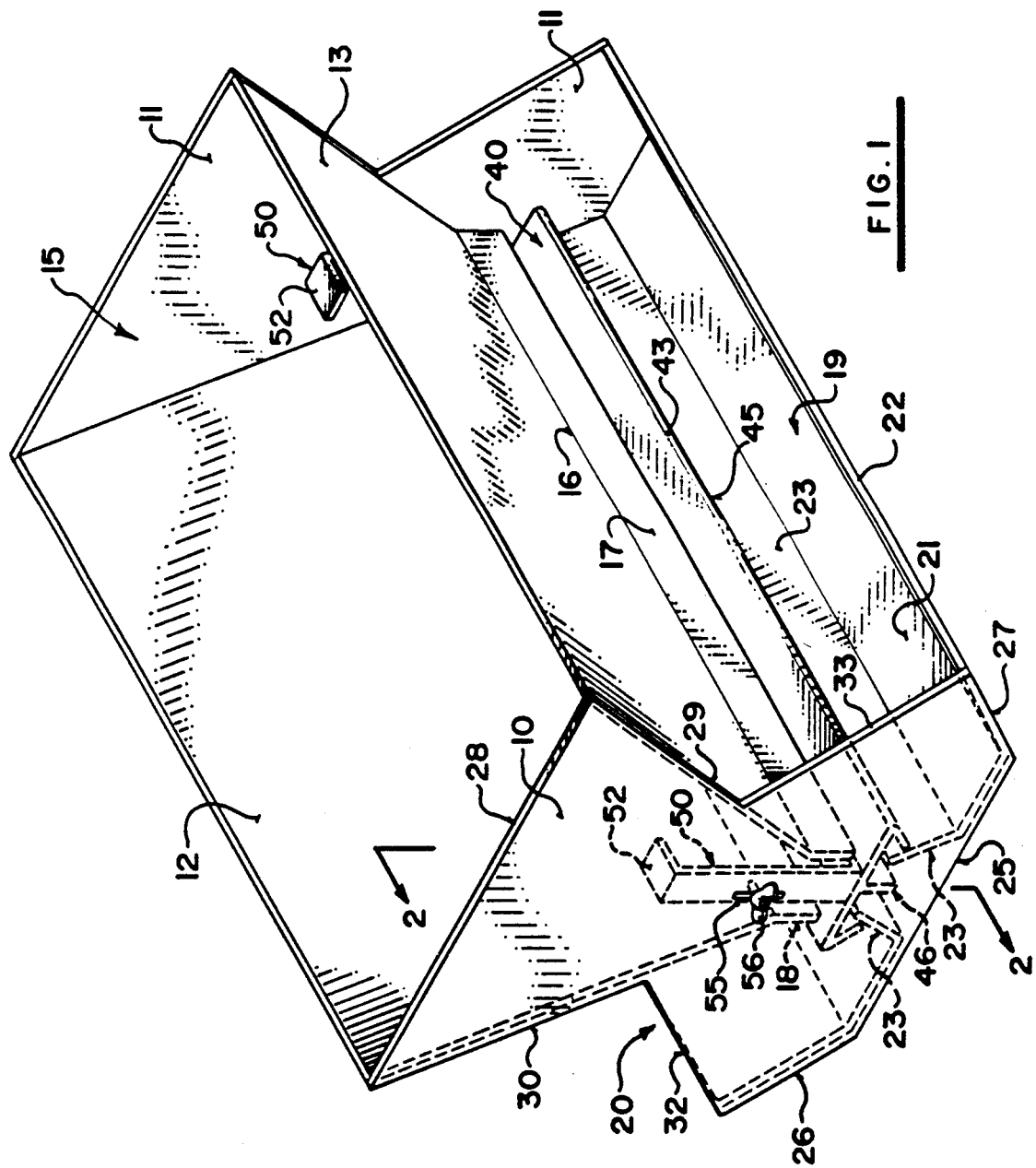
FIG. 1 is an isometric view of a feeder according to the invention.

The feeder as shown in FIG. 1 comprises a pair of end plates 10 and 11. A hopper section at the top of the feeder is defined by a pair of longitudinal walls 12 and 13 which converge inwardly from an open upper mouth 15 toward a narrow feed section 16 at which the walls 12 and 13 are bent to form vertical sections 17 and 18.

A pair of troughs is defined at the base of the end plates generally indicated at 19 and 20. Each of the troughs comprises a base wall 21 which lies flat on the floor surface, an inclined front wall 22 which extends upwardly and forwardly from the base wall, at an inclined rear wall 23 which extends upwardly and rearwardly from the base wall. A front edge of the front wall is indicated at 24 and is positioned at a height which allows the animal to reach over the front edge to the base for accessing the feed.

Each of the end plates has a flat bottom edge 25 which is welded to the ends of the base walls 21 of the troughs and thus lies flat on the floor surface. The end plates further include upwardly inclined edges 26 and 27 which are welded to the front walls of the troughs and follow the angle of the front wall. The end plates include an upper edge 28 lying in the same plane as the upper edges of the sides 12 and 13 to define the open mouth at the top of the hopper. Downwardly and inwardly inclined edges 29 and 30 of the end plates follow the line of the sides 12 and 13 of the hopper and are welded thereto. Edges 32 and 33 of the end plates extend from a position part way down the hopper walls to the front edge of the upper wall. This provides a stable structure which can rest firmly on the ground and is resistant to moving and damage by bodily force supplied by the feeding animals. Bars may be provided from the front edge of the upper wall of each of the troughs to the outer surface of the side wall of the hopper generally parallel to the side edges 32 and 33 of the end plate if required and these are of conventional construction.

A shelf construction generally indicated at 40 is provided underneath the mouth of the hopper defined by the vertical walls 17 and 18. The shelf comprises a horizontal wall 41 underlying the open mouth of the hopper and extending outwardly beyond the open mouth to an outer or front edge 42, 43 of the shelf with each of the front edges co-operating with a respective one of the troughs. The front edge is thus positioned above the base wall, rearwardly of the front wall and forwardly of the rear wall and particularly the upper edge of the rear wall.

As explained in the above mentioned U.S. Pat. No. 4,660,508, feed from the open mouth of the hopper flows onto the upper surface of the shelf with the shelf being shaped and arranged so that the feed material remains on the shelf so that it can accessed for eating by the animal reaching over the front edge of the front wall of the trough. The animal can then brush the material from the shelf into the trough as required to access the feed and to feed as desired.

The shelf further includes downwardly and rearwardly inclined flanges 44, 45 so that the front edge of the shelf is defined by a V-shaped portion of metal which is most suitable to enable the animal to eat off the shelf without damage to the animal's mouth and allowing comfort for the feeding action. On an underside of the shelf is provided a deflection baffle 46 in the form of a flat plate welded on the underside and extending directly downwardly on the underside approximately midway across the underside.

Figure 3:
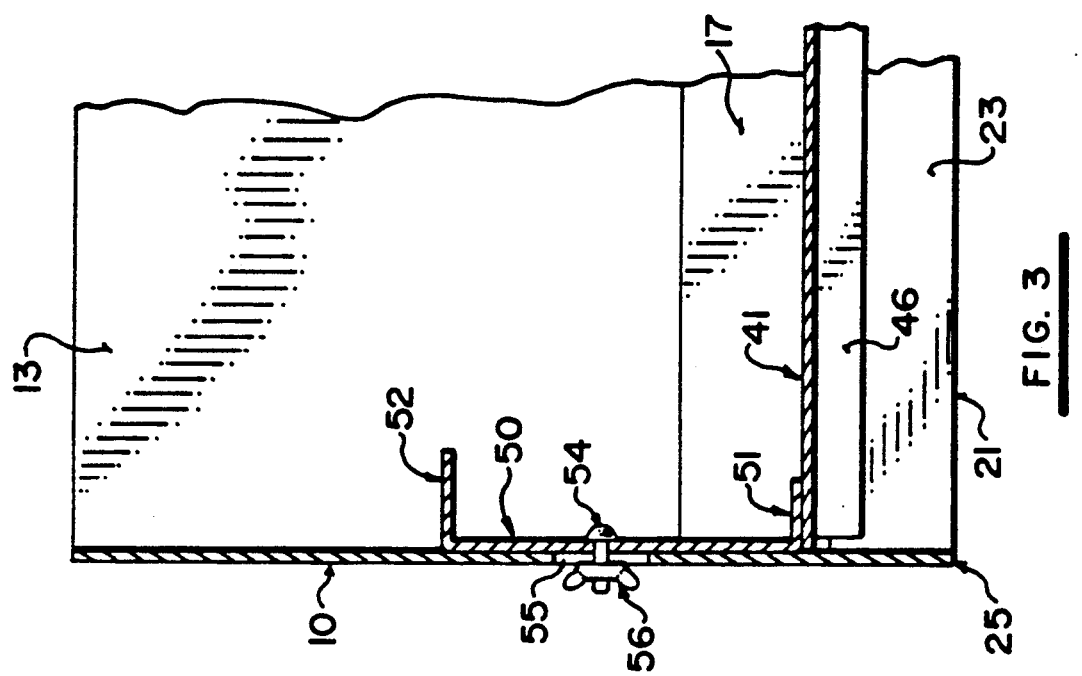
FIG. 3 is a cross sectional view along the lines 3—3 of FIG. 2.

The shelf is supported relative to the hopper by a pair of straps 50 each arranged at respective end of the shelf. In the drawings only one of the straps is visible in FIG. 2 and is shown in phantom in FIG. 1. As best shown in FIG. 3, the strap 50 extends along the inner surface of the end plate 10 and is attached to the horizontal shelf surface 41 by a flange 51 which extends parallel to the shelf and is welded thereto. A handle 52 is formed on the strap simply by bending a flange portion at the upper end of the strap 50 extending inwardly into the hopper area so that it can readily grasped by an operator reaching downwardly into the hopper.

The height of the shelf can thus be adjusted relative to the lower edge of the hopper and relative to the upper edge of the rear walls of the troughs simply by manually grasping the handle 52 and by pulling or pushing the handle to move it vertically along the end plates. The position of the strap relative to the end plate can be clamped by a bolt 54 which passes through a hole in the strap 50 and through a vertical slot 55 in the end plate 10. A wing nut 56 is provided on the outer side of the end plate 10 so that it can be manually operated to clamp the strap 50 at the required height.

Figure 2:
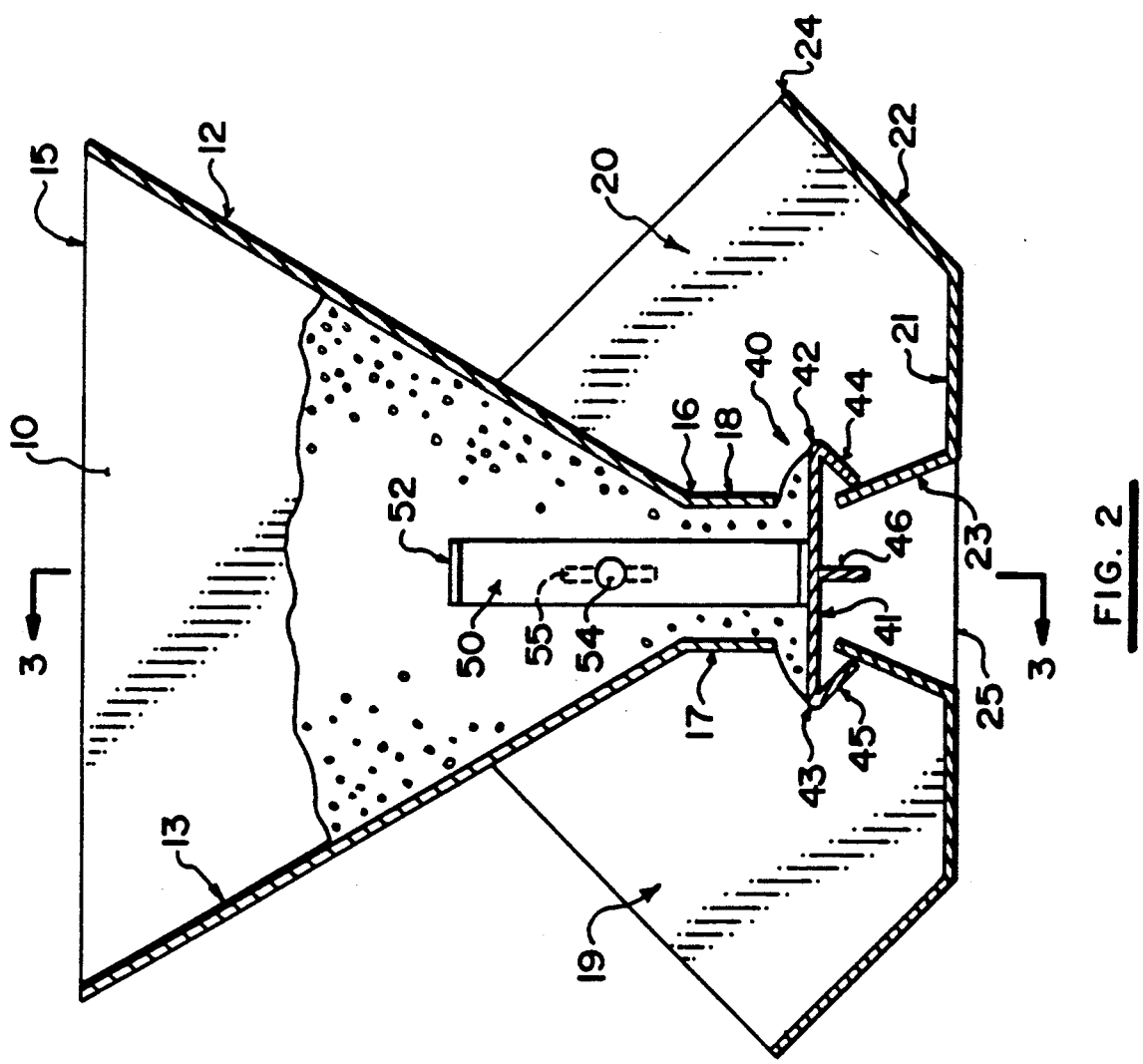
FIG. 2 is a cross sectional view along the lines 2—2 of FIG. 1.

The height of the shelf is thus adjustable in an operating position shown in FIG. 2 over relatively short distances to accommodate different flow characteristics of the feed material so that the feed material basically remains on the shelf as previously described and as described in the above mentioned patent.

Figure 4:
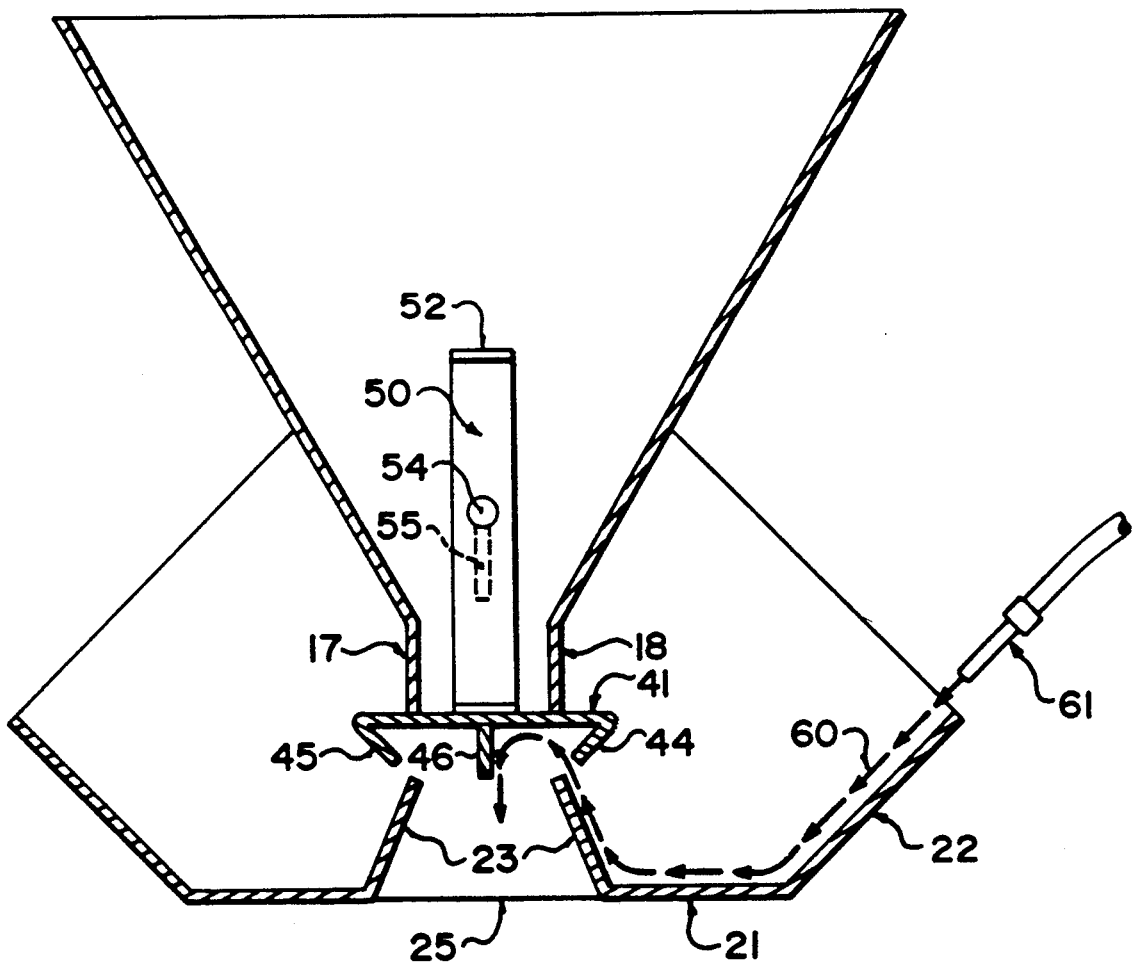
FIG. 4 is the same cross sectional view as that of FIG. 2 showing the feeder in a position for the cleaning process.

In addition the shelf can be raised to an inoperative cleaning position shown in FIG. 4. In this position the strap is pulled to its uppermost extent in which position the shelf surface 41 engages the lower edges of the walls 17 and 18 of the hopper to close off the mouth of the hopper. In this position the flanges 44 and 45 are raised upwardly to a position slightly above the upper edge of the walls 23 of the troughs. This defines a space between the shelf and the rear wall 23 of the trough. As shown in FIG. 4 a liquid jet 60 from a suitable conventional supply hose 61 can be injected into the trough so that the jet moves down the front wall 22, along the base wall 22 and up the rear wall 23 to engage the underside of the shelf wall 41. The deflector flange 46 then acts to turn the cleaning liquid and any deposits collected by the cleaning liquid in a downward direction onto the floor of the animal pen.

The rearward inclination of the rear wall 23 in cooperation with the flange 44 means that a relatively small vertical movement of the shelf opens up a larger space between the shelf and the rear wall to allow the cleaning fluid to escape.

The height of the shelf relative to the edge 24 is not of particular importance in this invention and as shown in FIG. 2, the shelf can be lower than the front edge 24 if required.

While the feeder shown in the drawings is a dry feeder in which the feed material is taken in dry condition on the shelf and if brushed into the trough is taken in dry condition in the trough, the design of the present invention can also be applied to a wet feeder in which a water supply is provided to the trough so that feed in the trough can be taken in wet condition. In such a case the height of shelf may be raised relative to the front edge 24 to ensure that sufficient spacing between the liquid in the trough and the shelf to prevent water contamination of the flowing feed at the shelf.

It may in some cases be only necessary in the cleaning action to raise the shelf at one end while the other end remains in the operating position. This movement is generally sufficient to open up a large enough space to allow the cleaning fluid to escape. In addition the fact that the one end remains in fixed position allows a rear adjustment of the spacing between the lower edge of the hopper and the upper surface of the shelf to be adjusted without difficulty.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A feeder for animals comprising a trough, means for supporting the trough on a floor surface; the trough being defined by a base wall on which feed can rest for being eaten by the animal, a front wall extending generally upwardly from the base wall to a front edge over which the animal standing on the floor surface can reach to access the feed on the base wall, and a rear wall extending generally upwardly from the base wall to an upper edge, the front wall, rear wall and base wall acting to confine the feed in the trough; the upper edge of the rear wall being shaped and arranged so that material falling outwardly therefrom falls onto the floor surface for disposal; a shelf having a front edge extending along the trough at a position above the base wall, rearwardly of the front wall, forwardly of the upper edge of the rear wall and a height accessible by the animal, the shelf having a downwardly extending flange along the front edge thereof; and a hopper above the shelf for depositing the feed onto the shelf for taking by the animal with any feed moved by the animal from the shelf falling into the trough; the shelf being positioned above the rear wall so that rear portion thereof, extends rearwardly of the upper edge of the rear wall, and said shelf being movable in a vertical direction from a first position, in which a lower edge of the flange at the front edge of the shelf is located below said upper edge of the rear wall and closely adjacent the rear wall, to a second position, in which the shelf is raised to define a first space between the lower edge of the flange and the rear wall and a second space between the upper edge of the rear wall and an underside of the shelf to allow a jet of cleaning fluid to exit from the trough moving up the rear wall, behind the flange, under the shelf and over the upper edge of the rear wall.

2. The invention according to claim 1 wherein the hopper includes a lowermost edge extending longitudinally of the shelf so as to define with the shelf a slot through which the feed can pass from the hopper onto the shelf, said shelf being adjustable so as to vary the width of the slot to accommodate feeds of different flow characteristics and being adjustable to a position in which the shelf is raised to substantially close said slot and to define said space.

3. A feeder for animals comprising a first and a second trough, means for supporting the troughs on a floor surface, each of the troughs being defined by a base wall on which feed can rest for being eaten by an animal, a front wall extending generally upwardly from the base wall to a front edge over which an animal standing on the floor surface can reach to access the feed on the base wall, and a rear wall extending generally upwardly from the base wall to an upper edge; the front wall, rear wall and base wall acting to confine the feed in the trough; the first and second troughs being arranged back-to-back so that the upper edges of the rear walls of the troughs lie adjacent, but spaced from one another apart with an opening therebetween so that material falling outwardly of the rear wall of each of the troughs falls from the upper edge of the rear wall of the trough onto the floor surface for disposal; a shelf mounted above the troughs for cooperation with both of the troughs and defining a first edge extending along the first trough at a position above the base wall of the first trough, rearwardly of the front wall of the first trough, forwardly of the upper edge of the rear wall of the first trough and at a height accessible by the animal, and having a second edge extending along the second trough at a position above the base wall of the second trough, rearwardly of the front wall of a second trough, forwardly of the upper edge of the rear wall of the second trough and at a height accessible by the animal, each of the first and second edges of the shelf having a downwardly extending flange therealong; and a hopper above the shelf for depositing the feed onto the shelf for taking by the animal with any feed moved by the animal from the shelf falling into a respective one of the troughs; the shelf being positioned above the rear walls of the first and second troughs so as to extend from the first edge thereof which is forward of the upper edge of the rear wall of the first trough to the second edge thereof which is forward of the upper edge of the rear wall of the second trough, and the shelf being movable in a vertical direction from a first position in which the flanges extend respectively from the first and second edges of the shelf to a lower edge of the respective flange located below said upper edge of the rear wall of the respective trough and closely adjacent the rear wall of the respective trough, to a second position in which the shelf is raised to define a first space between the lower edge of the flange and the rear wall of the respective trough and a second space between the upper edge of the rear wall of each of the troughs and an underside of the shelf to allow a jet of cleaning fluid to exit from each of the troughs moving up the rear wall of the respective trough, behind the flange of the respective edge of the shelf, under the shelf and over the rear edge of the respective trough.

4. The invention according to claim 3 wherein the shelf includes a longitudinal deflector member on the underside thereof between the rear walls such that the jet of leaning fluid engaging the undersurface of the shelf from either of the troughs is deflected downwardly to the opening between the troughs.

5. The invention according to claim 3 including a pair of end plates with each end plate defining adjacent ends of both of the troughs and of the hopper, the shelf including a pair of straps each strap being connected to a respective end of the shelf and extending vertically therefrom, each strap having a handle thereon by which the strap can be grasped and raised and lowered manually and screw coupling means for clamping each of the straps to a respective end plate for locating the height of the shelf at a required position.

6. The invention according to claim 5 wherein each of the straps extends upwardly on an inner surface of the respective end plate with the handle being positioned inwardly of the strap so as to be accessible from an upper face of the hopper.

* * * * *